US010471893B2

(12) United States Patent
Moon et al.

(10) Patent No.: US 10,471,893 B2
(45) Date of Patent: Nov. 12, 2019

(54) DEVICE FOR CONTROLLING OPERATION OF MODEM FOR VEHICLE IN ORDER TO PREVENT BATTERY DISCHARGE AND METHOD FOR CONTROLLING SAME

(71) Applicant: LG INNOTEK CO., LTD., Seoul (KR)

(72) Inventors: Jung Sik Moon, Seoul (KR); Hyoung Ki Nam, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 40 days.

(21) Appl. No.: 15/553,913

(22) PCT Filed: Feb. 16, 2016

(86) PCT No.: PCT/KR2016/001536
§ 371 (c)(1),
(2) Date: Aug. 25, 2017

(87) PCT Pub. No.: WO2016/137150
PCT Pub. Date: Sep. 1, 2016

(65) Prior Publication Data
US 2018/0043827 A1 Feb. 15, 2018

(30) Foreign Application Priority Data
Feb. 26, 2015 (KR) .................... 10-2015-0027146

(51) Int. Cl.
*B60Q 9/00* (2006.01)
*F02N 11/08* (2006.01)
(Continued)

(52) U.S. Cl.
CPC ............ *B60Q 9/00* (2013.01); *F02N 11/0807* (2013.01); *H04L 25/38* (2013.01);
(Continued)

(58) Field of Classification Search
CPC .............. H04L 67/12; H04W 52/0235; H04W 52/0261; Y02D 70/164; Y02D 70/24
See application file for complete search history.

(56) References Cited

U.S. PATENT DOCUMENTS

2002/0143645 A1* 10/2002 Odinak .............. G06Q 30/0266
705/26.81
2004/0127206 A1 7/2004 Van Bosch et al.
(Continued)

FOREIGN PATENT DOCUMENTS

KR 10-0385295 B1 5/2003
KR 10-2008-0090183 A 10/2008
(Continued)

OTHER PUBLICATIONS

Supplementary European Search Report dated Aug. 29, 2018 in European Application No. 16755800.6.
(Continued)

*Primary Examiner* — Ross Varndell
(74) *Attorney, Agent, or Firm* — Saliwanchik, Lloyd & Eisenschenk

(57) ABSTRACT

Provided is a device for controlling an operation of a modem for a vehicle in order to prevent battery discharge, comprising: a modem for a vehicle mounted on the vehicle; and a TCU (Telematic Control Unit) for frequently or periodically detecting a communication environment of the modem for the vehicle when the modem for the vehicle enters a standby state mode, and, when the number of times of repetition of a normal service state and a no-service state is larger than or equal to a reference value or when the number of times of repetition of communication network registration is larger than or equal to the reference value, cutting off standby power of the modem for the vehicle even before a standby time preconfigured in the modem terminates.

2 Claims, 4 Drawing Sheets

(51) Int. Cl.
*H04L 25/38* (2006.01)
*H04L 29/08* (2006.01)
(52) U.S. Cl.
CPC .......... *F02N 2250/06* (2013.01); *H04L 67/12* (2013.01); *Y02D 70/164* (2018.01); *Y02D 70/24* (2018.01)

(56) References Cited

U.S. PATENT DOCUMENTS

| | | | |
|---|---|---|---|
| 2009/0088910 A1* | 4/2009 | Yi | H04L 12/12 701/1 |
| 2010/0287138 A1 | 11/2010 | Pilgrim et al. | |
| 2017/0013559 A1* | 1/2017 | Sumitomo | H04W 52/0254 |
| 2017/0372535 A1* | 12/2017 | Miller | G07C 5/02 |

FOREIGN PATENT DOCUMENTS

| | | |
|---|---|---|
| KR | 10-2009-0081683 A | 7/2009 |
| KR | 10-2014-0059665 A | 5/2014 |
| WO | WO-2006/027843 A1 | 3/2006 |
| WO | WO 2015/185196 A1 | 12/2015 |

OTHER PUBLICATIONS

International Search Report in International Application No. PCT/KR2016/001536, filed Feb. 16, 2016.

\* cited by examiner

DEVICE FOR CONTROLLING OPERATION OF MODEM FOR VEHICLE IN ORDER TO PREVENT BATTERY DISCHARGE AND METHOD FOR CONTROLLING SAME

CROSS-REFERENCE TO RELATED APPLICATIONS

This application is the U.S. national stage application of International Patent Application No. PCT/KR2016/001536, filed Feb. 16, 2016, which claims priority to Korean Application No. 10-2015-0027146, filed Feb. 26, 2015, the disclosures of each of which are incorporated herein by reference in their entirety.

TECHNICAL FIELD

The teachings in accordance with exemplary and non-limiting embodiments of this disclosure relate generally to an apparatus for controlling modem operation for preventing battery discharge in vehicle, and a method thereof, and more particularly to an apparatus for controlling modem operation for preventing a battery discharge in a vehicle configured to prevent a battery discharge by cutting off a standby power of a modem for a vehicle (hereinafter referred to as "vehicular modem") even before a standby time preconfigured in the vehicular modem terminates when a number of times of repetition of normal service state and no-service state is larger than or equal to a reference value by frequently or periodically detecting a communication environment of the vehicular modem by a TCU (Telematic Control Unit) mounted at the vehicle.

BACKGROUND ART

A vehicle is mounted with a TCU and a vehicular modem. The TCU may provide various communication functions and host function by being connected to the vehicular modem. For example, the TCU can provide, by being connected to the vehicular modem, e-call, completely automated accident warning, defect call, local-support service telephone, traffic information, remote control lock, vehicle finding, remote-control diagnosis and vehicle data. The TCU can also perform the function of data modem to other devices mounted in a vehicle. The TCU may manage phone calls, and perform various call functions such as multi-phone hook-up and phone book data restoration. The TCU may automatically transmit a vehicle position in an accident or an emergency situation, and connect a voice phone.

Meantime, a vehicular modem maintains a service-on state by periodically monitoring a communication environment for a stable communication service. In addition, the TCU may maintain a modem in a standby state in order to start a vehicle or to receive a signal from a user for a predetermined time. For example, the modem may be set to maintain a standby state for 96 hours.

However, when a vehicle enters a communication shadow area or a vehicle is parked, the modem may be in a no-service state by deviating from the service on-state. Thus, in this case, a current consumption in modem disadvantageously increases to thereby result in a battery discharge in the vehicle, because many attempts are being made to secure communication channels.

DETAILED DESCRIPTION OF THE INVENTION

Technical Subject

The present disclosure is provided to address aforementioned disadvantages of the prior art, and it provides an apparatus for controlling modem operation for preventing a battery discharge in a vehicle configured to prevent a battery discharge by cutting off a standby power of a modem even before a standby time preconfigured in the modem terminates. Technical problems to be solved by the present disclosure are not restricted to the above-mentioned, and any other technical problems not mentioned so far will be clearly appreciated from the following description by skilled in the art.

Technical Solution

In one general aspect of the present disclosure, there is provided an apparatus for controlling modem operation for preventing a battery discharge in a vehicle, the apparatus comprising:
a modem mounted on the vehicle; and
a TCU (Telematic Control Unit) configured to monitor a communication environment of the modem when the modem enters a standby state mode, and, cut off standby power of the modem even before a standby time preconfigured in the modem in a first or second condition;
wherein the first condition includes a case where the count of reciprocating between a normal service state and a no-service state is larger than or equal to a reference value, and wherein the second condition includes a case where the number of repetition of communication network registration is larger than or equal to the reference value.

Preferably, but not necessarily, the modem may send a power supply termination request signal to the TCU when the preconfigured standby time terminates, and the TCU may cut off a power supplied to the modem.

Preferably, but not necessarily, the TCU may maintain the modem in a standby state for a preconfigured standby time in order to start a vehicle or to receive a signal from a user when the vehicle stalls.

Preferably, but not necessarily, the modem determines if the power supply from the TCU is interrupted, and changes from the standby state mode to a stop state mode if it is determined that the power supply from the TCU is interrupted.

Preferably, but not necessarily, the standby time is set in consideration of a current consumption of modem under the normal service state.

In another general aspect of the present disclosure, there is provided a method for controlling modem operation for preventing a battery discharge in a vehicle, the method comprising: setting a modem in a standby state in order to start a vehicle or to receive a signal from a user when the vehicle stalls;
counting a number of reciprocating between a normal service state and a no-service state of a communication state of the modem, or a number of repetition of communication network registration by monitoring the communication state of the modem; and
cutting off a power supplied to the modem, even if no power supply termination request is received from the modem by the TCU, when the number of reciprocating counted by the TCU or the number of repetition of communication network registration has exceeded a preconfigured reference value.

Preferably, but not necessarily, the method further comprises:
sending, by the modem, the power supply termination request to the TCU when a preconfigured standby time terminates; and
cutting off, by the TCU, the power supplied to the modem.

Preferably, but not necessarily, the method further comprises: maintaining, by the TCU, the modem at the standby state for a preconfigured standby time in order to receive a signal from a user device when the vehicle stalls and to start the vehicle in response to the received signal.

Preferably, but not necessarily, the method may further comprise: determining whether the power supply from the TCU is interrupted by the modem; and changing from standby state mode to stop state mode when it is determined that the power supply from the TCU is interrupted by the modem.

Preferably, but not necessarily, the preconfigured standby time may be set in consideration of a current consumption of the modem under the normal service state.

Advantageous Effects of the Disclosure

The present disclosure has an advantageous effect in that a battery discharge caused by sudden current loss that may be generated by a communication environment being in a unfavorable state can be effectively prevented by cutting off in advance, by a TCU mounted on a vehicle, a standby power of a vehicular modem even before a standby time preconfigured in the modem terminates if the number of times of repetition of communication network registration is larger than or equal to a reference value by frequently or periodically detecting the communication environment of the vehicular modem.

BEST MODE

This disclosure will be described more fully hereinafter with reference to the accompanying drawings, in which exemplary embodiments are shown.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It should be noted that although, unless otherwise defined, all terms used herein have the same meaning as commonly understood by one of ordinary skill in the art to which this invention belongs, there may be terms arbitrarily selected by an applicant in some particular cases, and in this case, its meaning is to be described in detail in the Detailed Description, and its terms are not simple terms but has particular meaning.

Throughout the specification, unless explicitly described to the contrary, the word "comprise", "include" and variations such as "comprises", "comprising", "includes" and "including" will be understood to imply the inclusion of stated elements but not the exclusion of any other elements.

Figure 1:
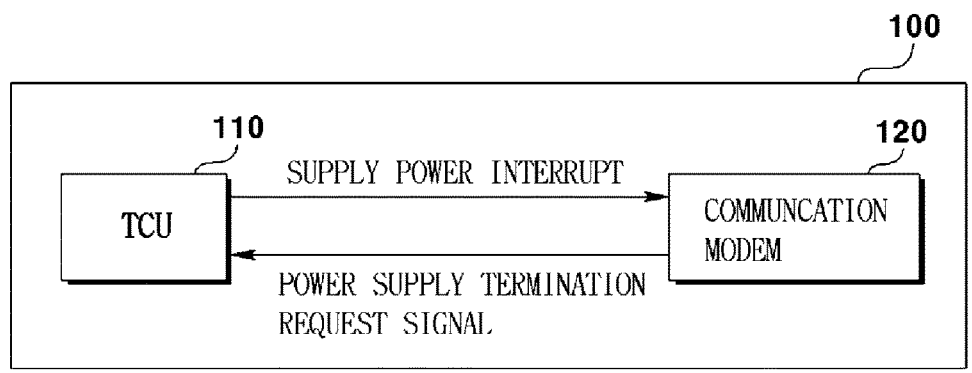
FIG. 1 is a schematic view illustrating a method for controlling modem operation for preventing battery discharge in vehicle according to an exemplary embodiment of the present disclosure.

FIG. 1 is a schematic view illustrating an apparatus for controlling modem operation for preventing battery discharge in vehicle according to an exemplary embodiment of the present disclosure.

Referring to FIG. 1, a system for controlling modem operation for preventing battery discharge in vehicle according to an exemplary embodiment of the present disclosure may include a TCU (Telematic Control Unit, 110) and a modem for a vehicle (120, sometimes hereinafter referred to as "vehicular modem"). The TCU (110) and the vehicular modem (120) are mounted on a vehicle. The TCU (110) can provide various communication functions and a host function in a vehicle in association with the vehicular modem.

For example, the TCU (110) can provide, by being connected to the vehicular modem, e-call, completely automated accident warning, defect call, local-support service telephone, traffic information, remote control lock, vehicle finding, remote-control diagnosis and vehicle data. The TCU (110) can also perform the function of data modem to other devices mounted in a vehicle. The TCU (110) may manage phone calls, and perform various call functions such as multi-phone hook-up and phone book data restoration. The TCU (110) may automatically transmit a vehicle position in an accident or an emergency situation, and connect a voice phone.

Meantime, a vehicular modem maintains a service-on state by periodically monitoring a communication environment for a stable communication service. In addition, the TCU (110) may maintain a modem in a standby state in order to start a vehicle or to receive a signal from a user for a predetermined time when an engine of a vehicle is turned off. For example, the modem may be set to maintain a standby state for 96 hours.

Thus, the vehicular modem can maintain a standby state for a set 96 hours even if an engine is turned off. An operating power for the vehicular modem (120) may be supplied from a battery while the standby state is maintained. The vehicular modem (120) may send a power supply termination request signal to the TCU (110) when the preconfigured 96 hours arrives by counting a lapse time after being converted the standby state.

Meantime, the TCU (110) may monitor a communication state of the vehicular modem (120) in real time. The communication state of the vehicular modem (120) may be divided to a normal service state and a no-service state. The normal service state means a state where a normal communication service is possible by being allocated with a wireless resource via connection to a public communication network at power intensity over a reference value. A power consumption of the vehicular modem (120) at a normal service state may be within a reference value range. Thus, even the 96 hours set for the vehicular modem (120) is also set in consideration of a current consumption of the vehicular modem (120) under the normal service state.

Meantime, the no-service state means a state where a normal communication service is impossible because of failure to be allocated with a wireless resource via connection to a public communication network or a normal communication service cannot be implemented even if being allocated due to weak power intensity. For example, the no-service state may correspond to a case where a vehicle is positioned at an environment of communication shadow state.

The communication state of the vehicular modem (120) may be repetitively switched between a normal service state and a no-service state. When the communication state of the vehicular modem (120) is repetitively switched between a normal service state and a no-service state, a current consumption grows increased, and therefore, it is necessary to take an action in advance lest the repetitive frequency (or time) reciprocating between the normal service state and the no-service state exceed a preconfigured reference frequency.

Toward this end, the TCU (110) may count a state change frequency of the communication state at the vehicular model (120) reciprocating between the normal service state and the no-service state while monitoring in real time the communication state of the vehicular model (120).

The TCU (110) can interrupt the power supplied to the vehicular modem (120), even if no power supply termination request signal is received from the vehicular modem (120) when the counted frequency passes the preconfigured reference value. Meantime, the TCU (110) may count the frequency of repetitively performing a communication network registration by the vehicular modem (120) by monitoring in real time the communication state of the vehicular modem (120). The TCU (110) may determine whether the counted frequency has reached the preconfigured reference value, and if it is determined that the counted frequency has reached the preconfigured reference value, the TCU (110) may interrupt the power supplied to the vehicular modem (120) even if the power supply termination request signal is not received from the vehicular modem (120) when the counted frequency passes the preconfigured reference value.

Meantime, the TCU (110) may interrupt the power supplied to the vehicular modem (120) when power supply termination request signal is received from the vehicular modem (120).

As discussed above, the discharge of battery can be prevented in advance by interrupting the standby power of the vehicular modem (120) even before the standby time preconfigured at the modem is terminated, when the repetitive frequency of normal service state and the no-service state exceeds the preconfigured reference value by frequently and periodically detecting, by the TUC (110) mounted on a vehicle, the communication environment of the vehicular modem (120), or when the repetitive frequency of communication network registration exceeds the reference value.

Figure 2:
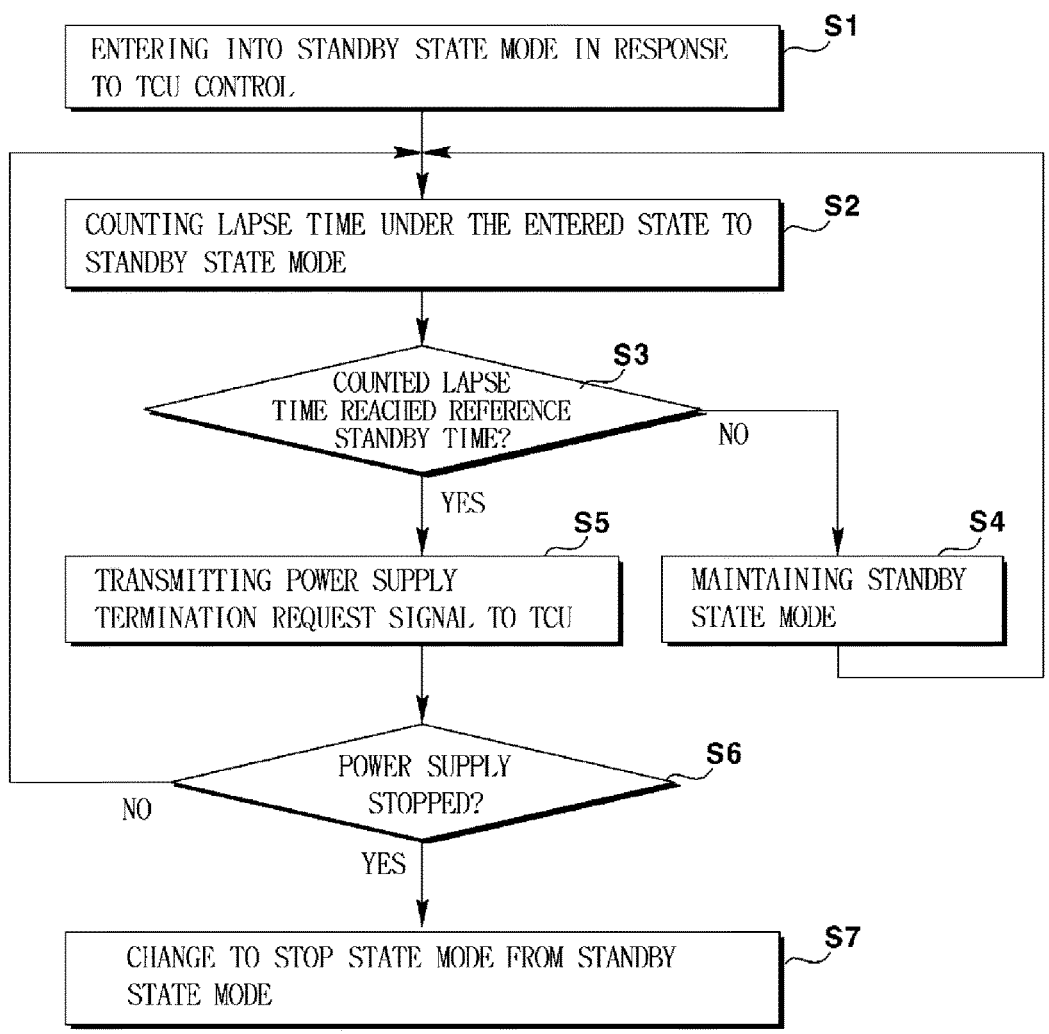
FIG. 2 is a schematic view illustrating a method for controlling modem operation for preventing battery discharge in vehicle according to an exemplary embodiment of the present disclosure.

FIG. 2 is a schematic view illustrating a method for controlling modem operation for preventing battery discharge in vehicle according to an exemplary embodiment of the present disclosure. Referring to FIG. 2, the vehicular modem (120) may enter a standby state mode in response to a control of the TCU (110) (S1). The vehicular modem (120) may count a lapse time while being entered into the standby state mode (S2). The vehicular modem (120) may determine if the counted lapse time has reached a preconfigured reference standby time (S3). As a result of the determination, if the counted lapse time has not reached the preconfigured reference standby time, the vehicular modem (120) may maintain the standby state mode (S4). As a result of the determination, if the counted lapse time has reached the preconfigured reference standby time, the vehicular modem (120) may send a power supply termination request signal to the TCU (110) (S5). As a result, the TCU (110) may stop the power supplied to the vehicular modem (120).

When the power supply from the TCU (110) is stopped by determining if the power supply from the TCU (110) has been interrupted (S6), the flow is changed from the standby state mode to stop state mode (S7). Meantime, the TCU (110) may determine if the power from the TCU (110) has been supplied (S7) even if the counted time has not reached the reference standby time, and change from the standby state mode to the stop state if there is no power supply.

Figure 3:
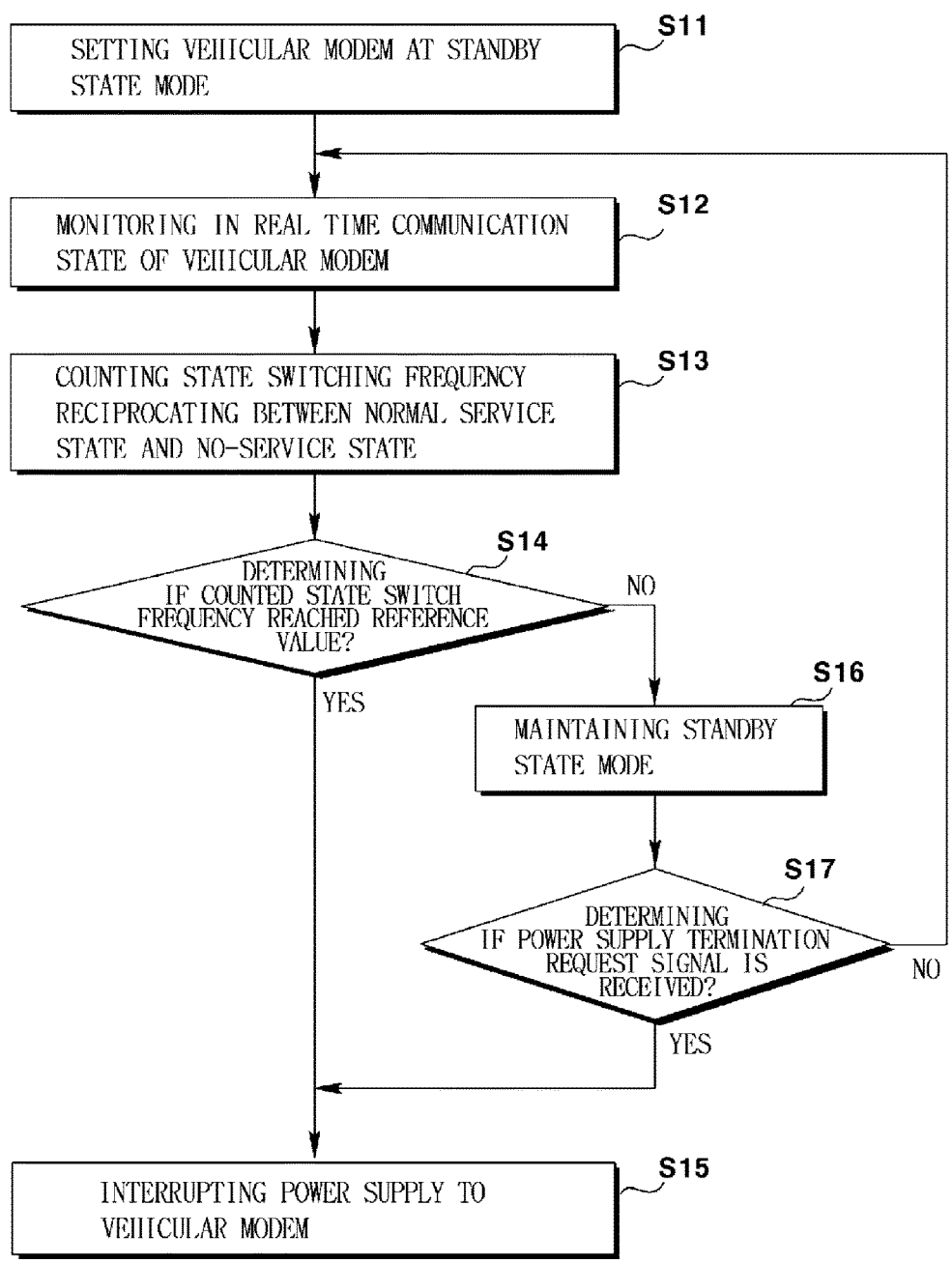
FIG. 3 is a schematic illustrating a TCU operation in a system for controlling modem operation in a vehicle according to an exemplary embodiment of the present disclosure.

FIG. 3 is a schematic illustrating a TCU operation in a system for controlling modem operation in a vehicle according to an exemplary embodiment of the present disclosure.

Referring to FIG. 3, the TCU (110) may set the vehicular modem (120) at a standby state mode in order to receive a signal of vehicle start or a user signal (S11). The TCU (110) may count a state change frequency reciprocating between a normal service state and a no-service state of the communication state at the vehicular modem (120) (S13) by monitoring the communication state of the vehicular modem (120) in real time (S13). The TCU (110) may determine if the counted state change frequency has reached a preconfigured reference value (S14).

As a result of the determination if the counted state change frequency has reached a preconfigured reference value, the TCU (110) may stop the power supplied to the vehicular modem (120) (S15) even if the power supply termination request signal is not received from the vehicular modem (120). As a result of the determination if the counted state change frequency has not reached a preconfigured reference value, the TCU (110) may maintain the standby state (S16).

Meantime, the TCU (110) may determine if the power supply termination request signal is received from the vehicular modem (120) (S17), and if it is determined that the power supply termination request signal is received from the vehicular modem (120), the TCU (110) may interrupt the power supplied to the vehicular modem (120) (S15). As a result of determination at S17, if it is determined that the power supply termination request signal is not received from the vehicular modem (120), the TCU (110) may proceed to a step (S12) of monitoring in real time the communication state of the vehicular modem (120).

Figure 4:
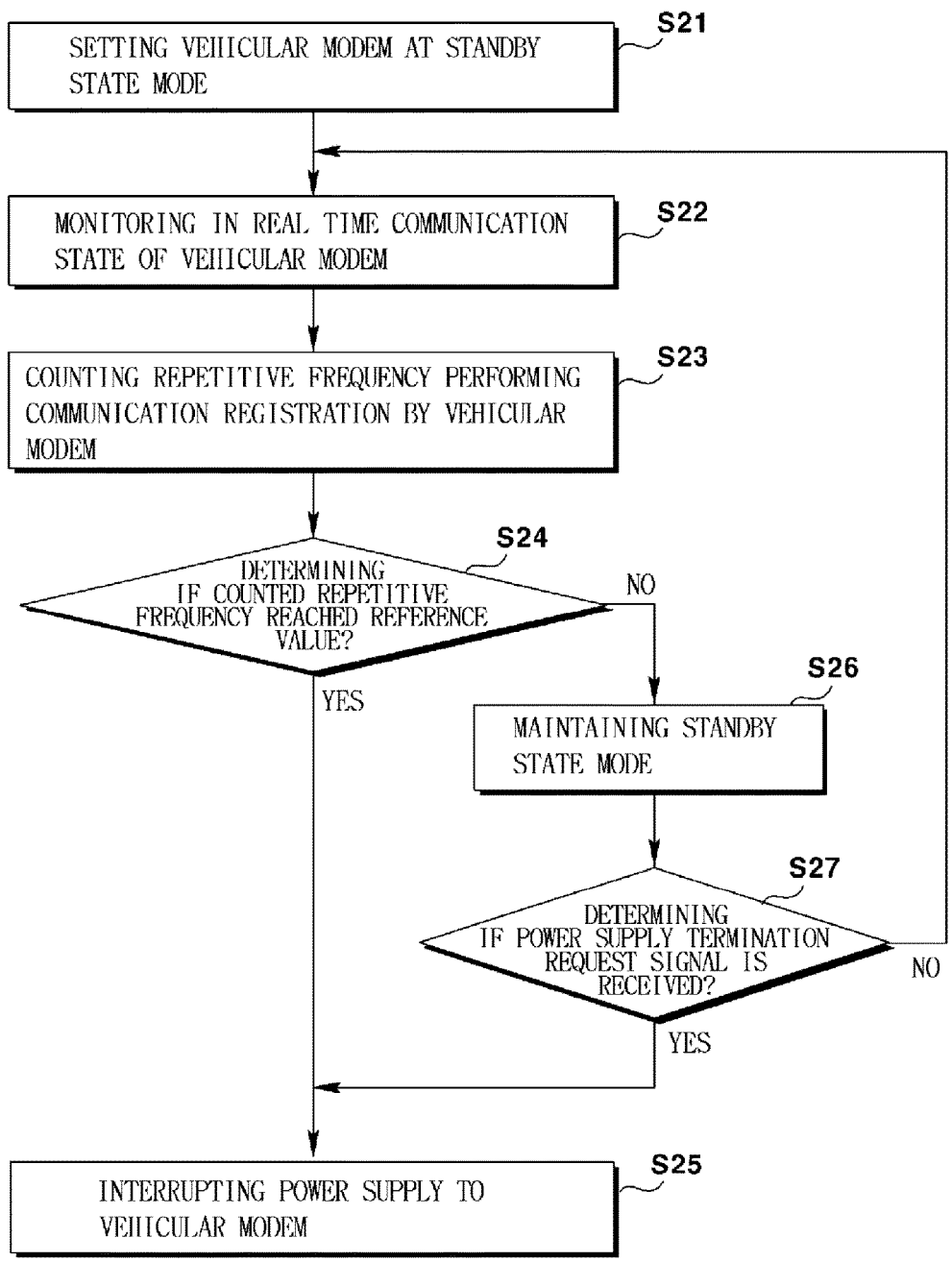
FIG. 4 is a schematic illustrating a TCU operation in a system for controlling modem operation in a vehicle according to an exemplary embodiment of the present disclosure.

FIG. 4 is a schematic illustrating a TCU operation in a system for controlling modem operation in a vehicle according to an exemplary embodiment of the present disclosure.

Referring to FIG. 4, the TCU (110) may count the repetitive frequency of performing the communication network registration of the vehicular modem (120) (S23) by monitoring in real time the communication state of the vehicular modem (120) (S22). The TCU (110) may determine if the counted repetitive frequency has reached the preconfigured reference value (S24).

As a result, if the counted repetitive frequency has reached the preconfigured reference value, the TCU (110) may interrupt the power supplied to the vehicular modem (120) (S25) even if the power supply termination request signal is not received from the vehicular modem (120). As a result, if the counted repetitive frequency has not reached the preconfigured reference value, the TCU (110) may maintain the standby state (S26).

Meantime, the TCU (110) may determine if the power supply termination request signal is received from the vehicular modem (120) (S27), and if it is determined that the power supply termination request signal is received from the vehicular modem (120), the TCU (110) may interrupt the power supplied to the vehicular modem (120) (S25). As a result of determination at S27, if it is determined that the power supply termination request signal is not received from the vehicular modem (120), the TCU (110) may proceed to a step (S22) of monitoring in real time the communication state of the vehicular modem (120).

Although the exemplary embodiments of the present disclosure have been described in detail, the description of the present disclosure is not intended to be exhaustive or limited to the invention in the form disclosed. Many modifications and variations will be apparent to those of ordinary skill in the art based upon the teachings herein without departing from the scope and spirit of the invention.

The invention claimed is:

1. An apparatus for controlling modem operation for inhibiting battery discharge in a vehicle, the apparatus comprising:
   a modem mounted on the vehicle; and
   a TCU (Telematic Control Unit) configured to: monitor a communication environment of the modem when the modem enters a standby state; cut off standby power of the modem even before a standby time preconfigured in the modem has elapsed if either a first condition or a second condition is met,
   wherein the first condition is a case where the count of reciprocations between a normal service state and a no-service state in the modem is larger than or equal to a reference value,
   wherein the second condition is a case where the number of repetitions of communication network registration of the modem is larger than or equal to the reference value,
   wherein the modem sends a power supply termination request signal to the TCU if the preconfigured standby time elapses, and the TCU cuts off a power supplied to the modem if the power supply termination request signal is received by the TCU,
   wherein the TCU maintains the modem in the standby state for the preconfigured standby time, if the number of reciprocations between the normal service state and the no-service state and the number of repetitions of communication network registration are both below the reference value, in order to start the vehicle or to receive a signal from a user when the vehicle stalls,
   wherein the modem determines if the power supply from the TCU is interrupted, and changes from the standby state to a stop state if it is determined that the power supply from the TCU is interrupted, and
   wherein the preconfigured standby time is set in consideration of a current consumption of the modem under the normal service state.

2. A method for controlling modem operation for inhibiting battery discharge in a vehicle, the method comprising:
   setting a modem in a standby state in order to start a vehicle or to receive a signal from a user when the vehicle stalls;
   counting at least one of a number of reciprocations between a normal service state and a no-service state of a communication state of the and a number of repetitions of communication network registration of the modem by monitoring the communication state of the modem;
   cutting off, by a TCU of the vehicle, a power supplied to the modem, even if a standby time preconfigured in the modem has not elapsed and no power supply termination request is received from the modem by the TCU, when the number of reciprocations counted by the TCU or the number of repetitions of communication network registration is larger than or equal to a preconfigured reference value;
   maintaining, by the TCU, the modem in the standby state for the preconfigured standby time, if the number of reciprocations between the normal service state and the no-service state and the number of repetitions of communication network registration are both below the preconfigured reference value, in order to receive a signal from a user device when the vehicle stalls and to start the vehicle in response to the received signal;
   sending, by the modem, a power supply termination request to the TCU if the preconfigured standby time elapses;
   cutting off, by the TCU, the power supplied to the modem if the power supply termination request is received by the TCU;
   determining whether the power supplied from the TCU to the modem is interrupted; and
   changing from the standby state to a stop state when it is determined that the power supplied from the TCU is interrupted,
   wherein the preconfigured standby time is set in consideration of a current consumption of the modem under the normal service state.

* * * * *